(12) United States Patent
Onozawa

(10) Patent No.: US 8,548,519 B2
(45) Date of Patent: *Oct. 1, 2013

(54) WIRELESS COMMUNICATION DEVICE

(75) Inventor: Katsuyuki Onozawa, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/431,453

(22) Filed: Mar. 27, 2012

(65) Prior Publication Data

US 2012/0184213 A1 Jul. 19, 2012

Related U.S. Application Data

(63) Continuation of application No. 11/564,907, filed on Nov. 30, 2006, now Pat. No. 8,150,449.

(30) Foreign Application Priority Data

Nov. 30, 2005 (JP) ................. 2005-346975

(51) Int. Cl.
*H04B 7/00* (2006.01)
*H04W 24/00* (2009.01)

(52) U.S. Cl.
USPC .............. 455/550.1; 455/41.2; 455/456.3

(58) Field of Classification Search
USPC ............. 455/550.1, 41.2, 404.1, 426.1, 418, 455/557, 456.3, 411, 403, 561
See application file for complete search history.

(56) References Cited

U.S. PATENT DOCUMENTS

| | | | |
|---|---|---|---|
| 7,289,800 B2 | 10/2007 | Rekimoto | |
| 7,352,732 B2 | 4/2008 | Sata et al. | |
| 7,561,183 B1 | 7/2009 | Schaffner | |
| 7,706,432 B2 | 4/2010 | Hashimoto | |
| 8,126,035 B2 | 2/2012 | Hashimoto et al. | |
| 8,155,587 B2 | 4/2012 | Sasai et al. | |
| 2004/0048571 A1* | 3/2004 | Kiyose | 455/41.2 |
| 2004/0235514 A1* | 11/2004 | Bloch et al. | 455/550.1 |
| 2004/0240565 A1 | 12/2004 | Santhoff et al. | |
| 2005/0032502 A1* | 2/2005 | Tokudome | 455/403 |
| 2005/0192056 A1 | 9/2005 | Karaki | |
| 2006/0003700 A1* | 1/2006 | Yasuda et al. | 455/41.2 |
| 2006/0229014 A1* | 10/2006 | Harada et al. | 455/41.2 |
| 2006/0258289 A1 | 11/2006 | Dua | |
| 2008/0205317 A1 | 8/2008 | Piipponen et al. | |
| 2009/0055123 A1 | 2/2009 | Razzell | |
| 2012/0196537 A1* | 8/2012 | Sasai et al. | 455/41.2 |

FOREIGN PATENT DOCUMENTS

| | | | |
|---|---|---|---|
| JP | 2001-156704 A | 6/2001 | |
| JP | 2002-118577 A | 4/2002 | |
| JP | 2002-288109 A | 10/2002 | |
| JP | 2003-188886 A | 7/2003 | |
| JP | 2004-015654 A | 1/2004 | |
| JP | 2004-248215 A | 9/2004 | |

(Continued)

*Primary Examiner* — Nizar Sivji
(74) *Attorney, Agent, or Firm* — Carter, DeLuca, Farrell & Schmidt, LLP

(57) ABSTRACT

A wireless communication device for effecting wireless communication using a short-range wireless communication method having a ranging function, which carries out wireless connection establishment/disconnection control using ranging information. For example, the wireless communication device determines the range to another wireless communication device within wireless communication range, and if it finds a wireless communication device present within a predetermined range establishes a wireless connection with that wireless communication device, and disconnects the connection if the wireless communication device with which the device is in wireless connection passes beyond a predetermined range.

28 Claims, 15 Drawing Sheets

(56) References Cited

FOREIGN PATENT DOCUMENTS

| | | |
|---|---|---|
| JP | 2005-128965 A | 5/2005 |
| JP | 2005-269612 A | 9/2005 |
| JP | 2005-323091 A | 11/2005 |
| JP | 2006-246057 A | 9/2006 |
| JP | 2007-502087 A | 2/2007 |
| JP | 2008-178114 A | 7/2008 |
| JP | 2008-544586 A | 12/2008 |
| WO | 2004/109933 A | 12/2004 |
| WO | 2006/092772 A | 9/2006 |

\* cited by examiner

WIRELESS COMMUNICATION DEVICE

CROSS REFERENCE TO RELATED APPLICATIONS

This application is a continuation of U.S. patent application Ser. No. 11/564,907, filed Nov. 30, 2006, now U.S. Pat. No. 8,150,449, which claims the benefit of Japanese Patent Application No. 2005-346975, filed Nov. 30, 2005, each of which are hereby incorporated by reference in their entirety.

BACKGROUND OF THE INVENTION

1. Field of the Invention

The present invention relates to a wireless communication device communicating data via wireless communication.

2. Description of the Related Art

Within recent advancements in high-speed wireless communication, one technology is known as UWB (Ultra-Wideband). The distinctive features of UWB are short-range high-speed wireless communication and low power consumption. The UWB transfer rate is approximately 10 times greater than the wireless LAN widely used at present, with transmission power on the order of approximately 1/30 that of the wireless LAN.

Given these characteristics, UWB is seen as a means for implementing a so-called home network. For example, wireless USB (Universal Serial Bus) is a standard that is aimed at making wireless the current wire communication standard USB using UWB. In addition since UWB can detect extremely short-duration pulses with high time-accuracy, it has very high ranging accuracy between UWB devices by using the time difference between transmission and reception.

Using wireless communication increases the freedom of connection between devices that hitherto had been connected using a cable or the like, improving user convenience. At the same time, however, with wireless communication, since the connection between devices is invisible it becomes difficult for the user to tell which device is connected with which. In addition, where a plurality of wireless communication devices are present in a range within which wireless communication is possible, although it is possible to use unique parameters such as the IDs or the IP addresses of each device to effect wireless connection, it takes time and effort to input those unique parameters and the input methods are complicated. In particular, when applying this type of wireless connection method to compact devices such as digital cameras, it is necessary to input these unique parameters using only a few small buttons or keys, which adversely affects user operability.

As a result, at present, a technology for effecting wireless connection and disconnection between desired wireless communication devices without a complicated key operation or the like is sought. For example, in Japanese Patent Application Laid-Open No. 2002-118577, a method for effecting a wireless connection by reducing the power of radio waves emitted in an authentication mode as well as confirming entry into a range of radio waves generated by other wireless communication devices either automatically or by the user is proposed.

However, with the method described in Japanese Patent Application Laid-Open No. 2002-118577, where a plurality of other wireless communication devices are within wireless communicable range, it is not easy for the user to know with which device(s) he or she can communicate. In addition, since the range of radio waves used in wireless communication varies depending on usage conditions and the location of the devices, the user cannot know with certainty the device(s) with which connection has been established.

SUMMARY OF THE INVENTION

The present invention is directed to overcome the above-described drawbacks and disadvantages. The present invention is, for example, to provide a wireless communication device capable of implementing wireless connection as well as disconnection between desired wireless communication devices using simple operations.

According to an aspect of the present invention, there is provided a wireless communication device that carries out wireless communication using a short-range wireless communication method having a ranging function, the wireless communication device comprising: a ranging unit which determines distances to other wireless communication devices within a wireless communication distance using the ranging function; an identification unit which, using the determined distances, identifies a communication device from among the other wireless communication devices as an identified other wireless communication device with which a wireless connection is to be established; a control unit which establishes wireless connection with the identified other wireless communication device; and a data transmission unit which carries out data transmission using the wireless connection, wherein the ranging unit determines the distance to the identified other wireless communication device with which the wireless connection is established and the control unit disconnects the wireless connection if the distance to the identified other wireless communication device satisfies a predetermined condition.

Further features and aspects of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate exemplary embodiments, features and aspects of the present invention and, together with the description, serve to explain the principles of the present invention.

DESCRIPTION OF THE EMBODIMENTS

Exemplary embodiments, features and aspects of the present invention will now be described in detail below with reference to the attached drawings.

First Exemplary Embodiment

Figure 1:
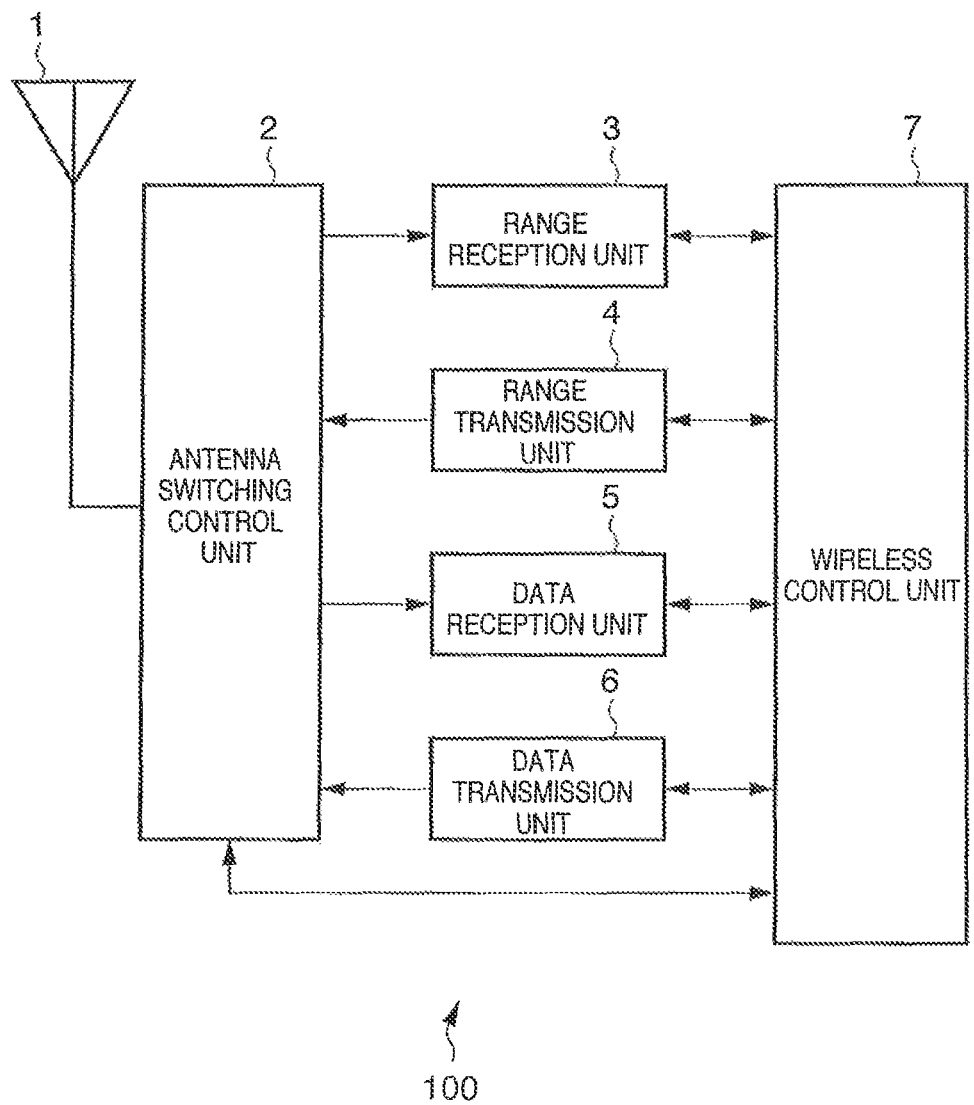
FIG. 1 is a block diagram showing the main structural components of a wireless communication unit 100 used in a wireless communication device of a first exemplary embodiment of the present invention.

FIG. 1 is a block diagram showing the main structural components of a wireless communication unit 100 used in a wireless communication device of a first exemplary embodiment of the present invention. The wireless communication unit 100 shown in FIG. 1 may be built into the wireless communication device or it may be removable from the wireless communication device. In addition, a personal computer (PC), printer, digital camera, digital video camera, camera-equipped mobile phone, television receiver or the like can be used as the wireless communication device of the first and other exemplary embodiments.

The wireless communication unit 100 of the first exemplary embodiment performs wireless communication using a short-range wireless communication method having a ranging function. Although the short-range wireless communication method having a ranging function may be any method, in the first and other exemplary embodiments, UWB (Ultra-Wideband) under consideration by IEEE 802.15.3a is used. Of course, it is also possible to use a wireless USB standard using UWB.

The wireless communication unit 100 of the first exemplary embodiment comprises an antenna 1, and a range reception unit 3 and a range transmission unit 4 both for carrying out a UWB ranging function for measuring the distance to a UWB device. Radio waves (or pulses) for ranging based on UWB are transmit from the range transmission unit 4 and received by the range reception unit 3. In the first and other exemplary embodiments, radio waves (or pulses) for ranging based on UWB is called a "UWB distance measuring waves". The wireless communication unit 100 also comprises a data reception unit 5 for receiving data from other wireless communication devices, and a data transmission unit 6 for transmitting data to other wireless communication devices. An antenna switching control unit 2 switches the connection of the antenna 1 and the transmission and reception units 3-6 during ranging and during data transmission. A wireless control unit 7 controls the entire wireless communication device. It should be noted that the wireless control unit 7 has the function of determining the device to which wireless connection should be established using a measured distance.

Figure 8:
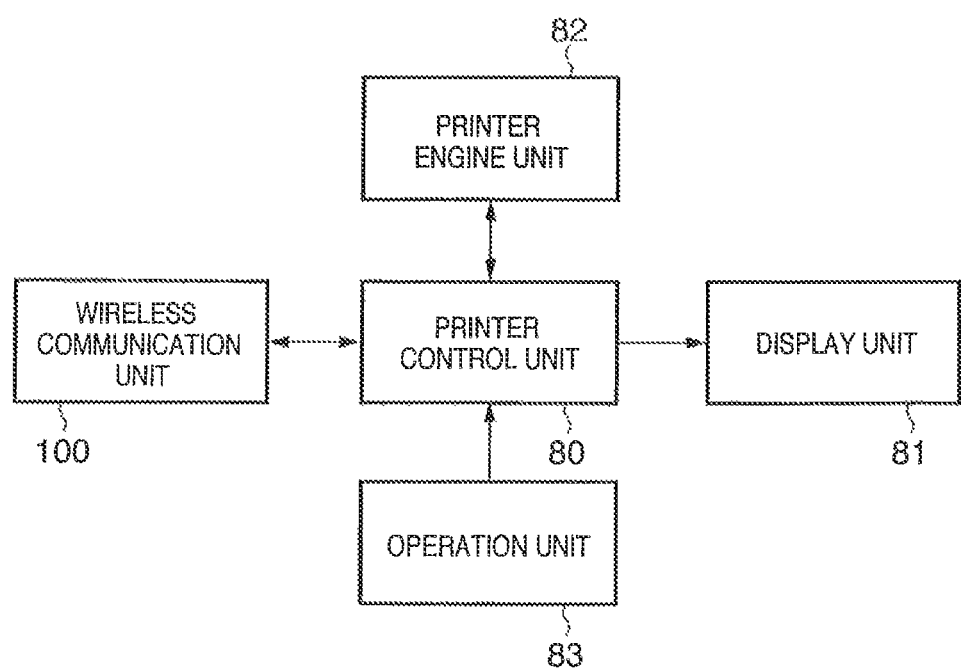
FIG. 8 is a block diagram showing the main structural components of the printer 8 that is an example of the wireless communication device of the first exemplary embodiment of the present invention.

FIG. 8 is a block diagram showing the main structural components of the printer 8 that is an example of the wireless communication device of the first exemplary embodiment.

A printer control unit 80 controls the operation of the printer. The printer control unit 80 comprises a CPU (Central Processing Unit), a storage device (a non-volatile memory, hard disk drive or the like) containing a control program executable by such CPU, and a RAM (Random Access Memory) used as a work area by such CPU.

A display unit 81 is usually a display device such as an LCD (Liquid Crystal Display), organic EL display or the like. The display unit 81 displays the operating status of the printer 8 as well as messages to the user, image data transmitted from the digital camera 9 and the like, in accordance with control by the printer control unit 80.

A printer engine unit 82 is the mechanism portion that executes printing to a recording medium such as sheets of paper or the like. In addition to a transport mechanism for the recording medium, the printer engine 82 includes a print head and an ink tank (if the printer 8 is an ink jet printer) or a process cartridge (if the printer 8 is a laser printer).

The user uses an operation unit 83 to input commands to the printer, for which buttons, keys, touch panels and the like are generally used.

The printer control unit 80 can also control the operation of the wireless communication unit 100. However, processes relating to the establishment and the disconnection of wireless connections with other wireless communication devices are carried out chiefly by the wireless communication unit 100, with such events as wireless connection establishment and disconnection reported from the wireless control unit 7 to the printer control unit 80. The printer control unit 80 responds to these events, and, for example, prepares for data transmission, controls the print operation, and so forth.

It should be noted that, in FIG. 8, for ease of description and understanding, the printer 8 is described as having only a print function. However, it goes without saying that the printer 8 may further comprise a scanner function, a fax function, and so forth.

Figure 9:
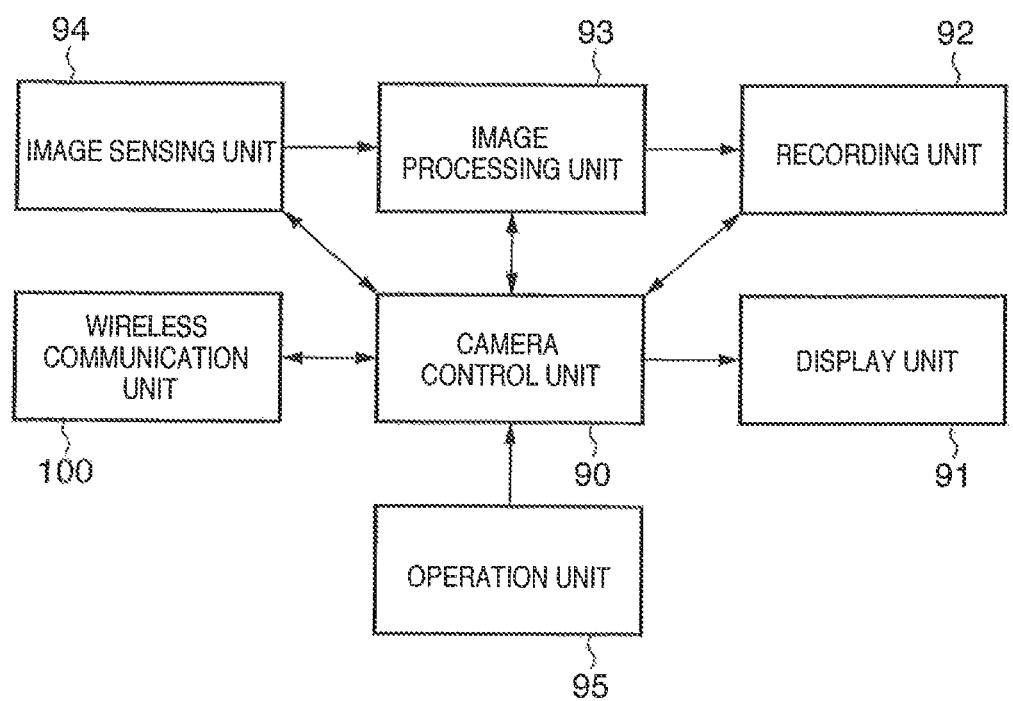
FIG. 9 is a block diagram showing the main structural components of a digital camera 9 that is an example of the wireless communication device of the first exemplary embodiment of the present invention.

FIG. 9 is a block diagram showing the main structural components of a digital camera 9 that is an example of the wireless communication device of the first exemplary embodiment.

A camera control unit 90 controls the operation of the digital camera 9. The camera control unit 90 comprises a CPU, a storage device (a non-volatile memory, hard disk drive or the like) containing a control program that can be executed by such CPU, and a RAM that is used as a work area by such CPU.

The display unit 91 is usually a display device such as an ordinary LCD, an organic EL display or the like. The display unit 91 displays the operating status of the digital camera 9, messages to a user, sensed image data that a recording unit 92 outputs from a storage medium, information (ranging results and the like) transmitted from the printer 8 and the like, in accordance with control by the camera control unit 90. It should be noted that a speaker or other audio output device may be provided as part of the display unit 91.

The recording unit 92 records sensed image data of the digital camera 9 onto a removable storage medium such as a memory card or onto a storage medium that is built into the digital camera 9. In addition, the recording unit 92 also outputs image data recorded on the storage medium.

An image processing unit 93 performs a series of image processes that is a so-called development process, which involves A/D conversion of analog data output from an image sensing unit 94 to digital data, white balance processing, color interpolation processing and so forth. In addition, the image processing unit 93 as necessary also compresses the sensed image data prior to recording to the recording unit 92.

The image sensing unit 94 comprises an image sensing lens, a mechanical shutter, an aperture, an auto focus (AF) lens drive motor, an image sensing element and so forth. The image sensing element is for example a CCD sensor, a CMOS image sensor or the like. The image sensing unit 94, in accordance with control by the camera control unit 90, focuses the subject image onto the image sensing element, exposes the image sensing element, and outputs the sensed image as analog data.

The user uses the operation unit 95 to input commands to the digital camera 9, for which buttons, keys, touch panels and the like are generally used.

The camera control unit 90 can also control the operation of the wireless communication unit 100. However, processes relating to the establishment and the disconnection of wireless connections with other wireless communication devices are carried out chiefly by the wireless communication unit 100, with such events as wireless connection establishment and disconnection reported from the wireless control unit 7 to the camera control unit 90. The camera control unit 90 responds to these events, and, for example, prepares for data transmission, controls the message display, and so forth.

It should be noted that digital camera 10 also is an example of the wireless communication device of the first exemplary embodiment, and has the same structure as the digital camera 9.

Figure 2:
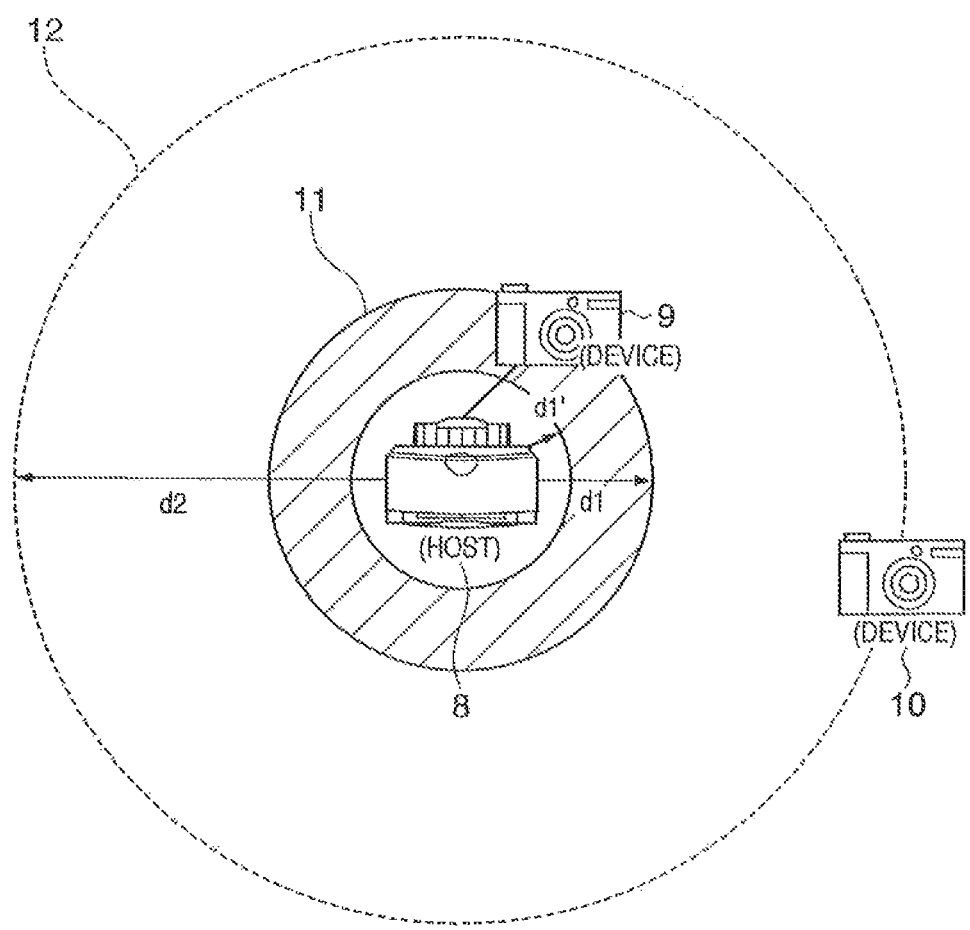
FIG. 2 is a diagram showing schematically a first example of connection/disconnection control in the first exemplary embodiment of the present invention.

FIG. 2 is a diagram showing schematically the printer 8, and the digital camera 9 and the digital camera 10 within a UWB communicable range 12 of the printer 8.

In this case, the printer 8 is connected wirelessly to one of the two digital cameras 9 and 10 for direct printing. It should be noted that, in the first exemplary embodiment, a function that sets up communication directly between an image capture device such as a digital camera and a printer and prints image data on the image capture device side at the printer is called "direct printing". As a technology for implementing direct printing, the Pictbridge (CIPA DC-001-2003) standard or the like is known.

In the example shown in FIG. 2, the printer 8 operates as a host while the digital cameras 9, 10 operate as devices. In addition, the printer 8 and the digital cameras 9, 10 are devices which recognize each other in advance as capable of wireless communication by UWB. Further, determination of the distance to the other parties using the UWB function (that is, ranging) is carried out by the printer 8, which uses the ranging results to determine whether or not to effect a wireless connection with the digital cameras 9, 10. In the first and other exemplary embodiments, a device that is capable of wireless communication by UWB and which operates as a host like the printer 8 is called a "UWB host". In addition, devices that are capable of wireless communication by UWB and which operate as devices like the digital cameras 9, 10 is called a "UWB device".

In addition, the determination of the range of wireless communication for direct printing by the printer 8 and the digital cameras 9, 10 (that is, the breadth of a UWB connectable area 11) is made by the printer 8. The user can set the UWB connectable area 11 to any range within a UWB wireless communication range (that is, a UWB communicable range 12).

The distinctive feature of the wireless communication device of the first exemplary embodiment is that it controls wireless connection and disconnection to other wireless communication devices based on distance information to UWB devices within wireless communication range. Although there is no special limitation on how the distance information is used and what sort of connect/disconnect control is carried out, a description is given of an example of such control below. This connect/disconnect control is executed by the wireless control unit 7.

(1) Connection (1-a) connect to a UWB device that has approached to within a predetermined distance (1-b) connect to a UWB device that has approached to within a predetermined distance within a predetermined time period (1-c) connect to a UWB device that has approached to within a predetermined distance a predetermined number of times within a predetermined time period (1-a') connect to a UWB device that has approached closer than a predetermined distance in a predetermined operating status (2) Disconnection (2-a) disconnect from a connected UWB device that has gone beyond a predetermined distance (2-b) disconnect from a connected UWB device that has gone beyond a predetermined distance within a predetermined time period (2-c) disconnect from a connected UWB device that has gone beyond a predetermined distance a predetermined number of times within a predetermined time period (2-a') disconnect from a connected UWB device that has entered a predetermined operating status, and further, has gone beyond a predetermined distance Although any combination of connections and disconnections is possible, for ease of description and understanding, a detailed description is given of Examples 1-4 below:

|  | Connect | Disconnect |
| --- | --- | --- |
| <Example 1> | (1-a) | (2-a) |
| <Example 2> | (1-b) | (2-b) |
| <Example 3> | (1-c) | (2-c) |
| <Example 4> | (1-a') | (2-a') |

Example 1

In a case in which both digital cameras 9, 10, which are capable of wireless communication with the printer 8, are within UWB communicable range 12 of the printer 8 as shown in FIG. 2, the wireless communication unit 100 determines the distances to the digital camera 9 and the digital camera 10 using the UWB ranging function. The UWB ranging function is a ranging function conforming to UWB. The wireless communication unit 100 then compares the distance information received as a result to the UWB connectable area 11 that is set in advance by the user and identifies one of the two digital cameras 9 and 10 as one with which a connection should be established, specifically, effecting a wireless connection with the digital camera that is within the UWB connectable area 11 (in this case, digital camera 9). This can also be called control that establishes wireless connection to the digital camera 9 that is a UWB device that has approached to within a predetermined range that defines the UWB connectable area 11.

In addition, the wireless communication unit 100 periodically measures the distance to the wirelessly connected digital camera 9, updates the distance information, and monitors the connected device. The time interval at which ranging is carried out can be set according to the processing load, but the smaller the distance d1 that defines the UWB connectable area 11 the shorter this time interval will be. If it is determined that the digital camera 9 has left the UWB communicable range 12, the printer 8 disconnects the connection to the digital camera 9 and then checks for other wireless communication devices in the UWB connectable area 11.

Here, the distance d1 (UWB connectable area 11) that is the precondition for establishing a wireless connection and the distance (disconnect distance) d2 (the UWB communicable range 12) that is the precondition for disconnecting a wireless connection are different. Therefore, once connected, the user can move the digital camera 9 freely about within a range of distance d2 from the printer 8.

In the case of the Example 1, the user can connect the digital camera 9 and the printer 8 like they were connected by a conventional USB cable or the like simply by moving the digital camera 9 storing the image data that the user wishes to print closer to the printer 8 until it enters the UWB connectable area 11. Then, after connection has been completed, by selecting with the digital camera 9 the image to be printed using any well-known method and instructing printing to be executed, the desired image can be printed out from the printer 8. In addition, when the user wishes to disconnect the connection, moving the digital camera 9 to a location beyond the distance d2 from the printer 8 automatically disconnects the connection.

Thus, according to the Example 1, one connects a device by moving a connecting device toward that device and disconnects by moving away from that device, thus enabling the user to connect to and disconnect from a desired device intuitively, without having to input parameters, carry out operations that explicitly select the connection, and so forth.

It should be noted that it is preferable to give the user notice of the status of the connection between the digital camera 9 and the printer 8, as well as of the operations for carrying out connection and disconnection (in the Example 1, how close to bring the digital camera 9 to (or how far to move the digital camera 9 away from) the printer 8). Such notice can be given, for example, by displaying messages using the display unit 91 of the digital camera 9, by sound output using the speaker, and so forth.

Figure 6:
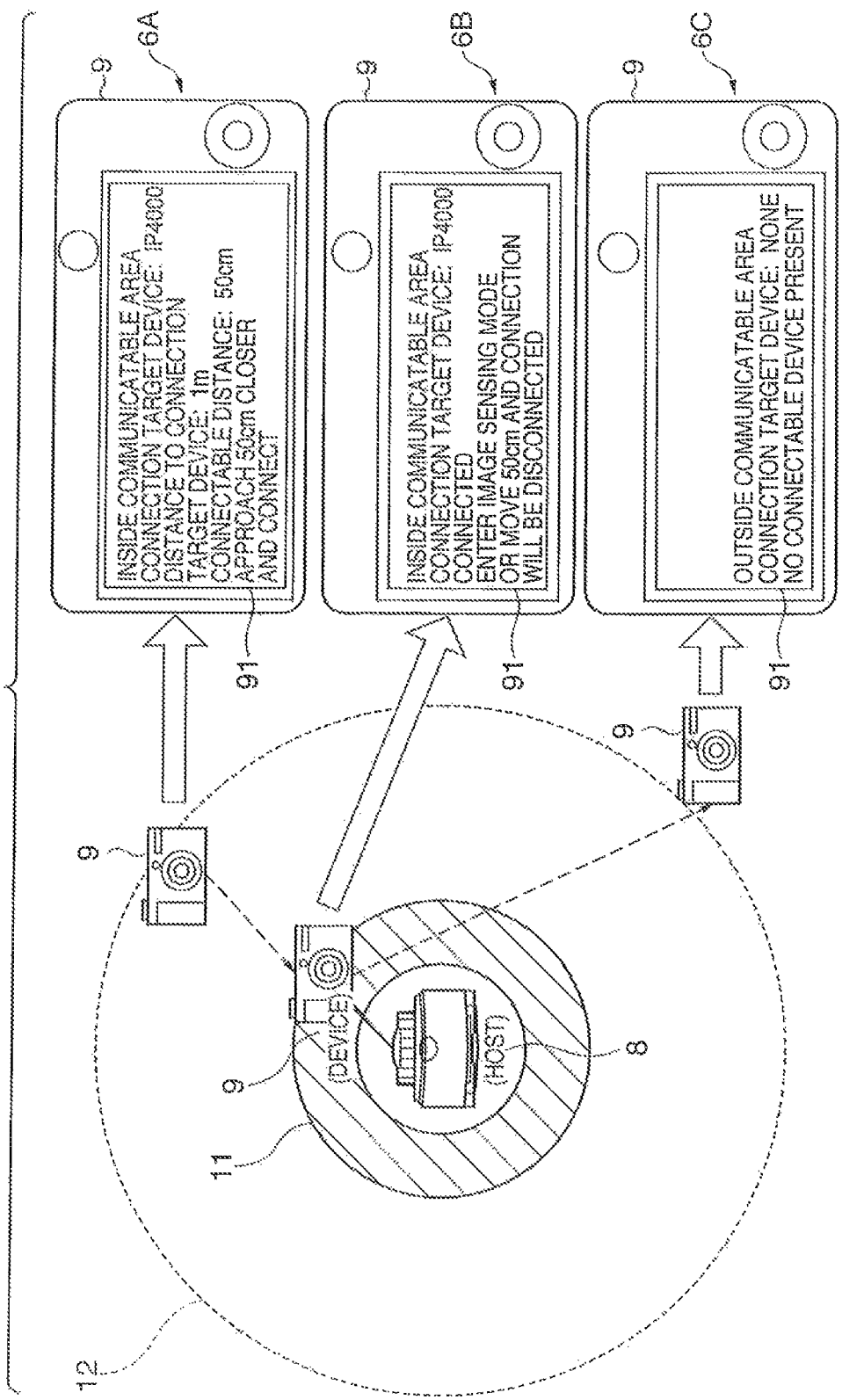
FIG. 6 is a diagram showing examples of messages displayed in response to the position of a digital camera in the first exemplary embodiment of the present invention.

For example, when the digital camera 9 enters the UWB communication range (the UWB communicable range 12) of the printer 8, notice can be given by a message display like that shown as 6A in FIG. 6. In this example, the display unit 91 of the digital camera 9 displays the fact that the device is within wireless communication range; the current distance to the printer 8; the distance necessary to move until connection is possible; and the next operation that should be carried out in order to effect a connection. It should be noted that, although in the first exemplary embodiment the ranging process is carried out by the printer 8, the digital camera 9 gets the ranging results either because the digital camera 9 acquires them or because the printer 8 reports them. Alternatively, matters may be configured so that the digital camera 9 also determines the distance to the printer 8.

In addition, once the digital camera 9 enters the UWB connectable area 11 and a wireless connection with the printer 8 is established, the fact that the two are connected and an expected next operation (in this case, the method of disconnecting the wireless connection) are displayed (6B in FIG. 6) It should be noted that emitting a chime or a beep from the speaker of the display unit 91 at the moment a connection is established enables the user to confirm the connection by sound.

Thereafter, if the digital camera 9 moves away from the printer 8 and leaves the UWB communicable range 12, the connection is disconnected and the fact that there is no device that can be connected is displayed on the display unit 91 (6C in FIG. 6), Matters can be configured so that a chime or beep is emitted when a connection is disconnected as well so as to notify the user. At this time, in order to distinguish from when commencing a connection, the sound tone or the number of times the sound is made may be varied (for example, once when starting a connection and twice when disconnecting). Providing the user with the information and the operations necessary for wireless communication in this manner enables user convenience to be improved.

As in the Example 1, in the Examples 2-4 below the user can also be notified by message display or audio output from the digital camera 9.

It should be noted that, in the Example 1, the UWB connectable area 11 is defined by the radius of a circle centered on the printer 8. However, the region near the printer 8 may be removed from the UWB connectable area 11. For example, in FIG. 2, a region up to but not including a distance d1' from the printer 8 (required minimum distance) can be the removed from the connectable area. In this case, if the digital camera 9 approaches to within this set required minimum distance of the printer 8, it can be deemed to have left the UWB connectable area 11 and wireless communication can be disconnected.

Example 2

Figure 3:
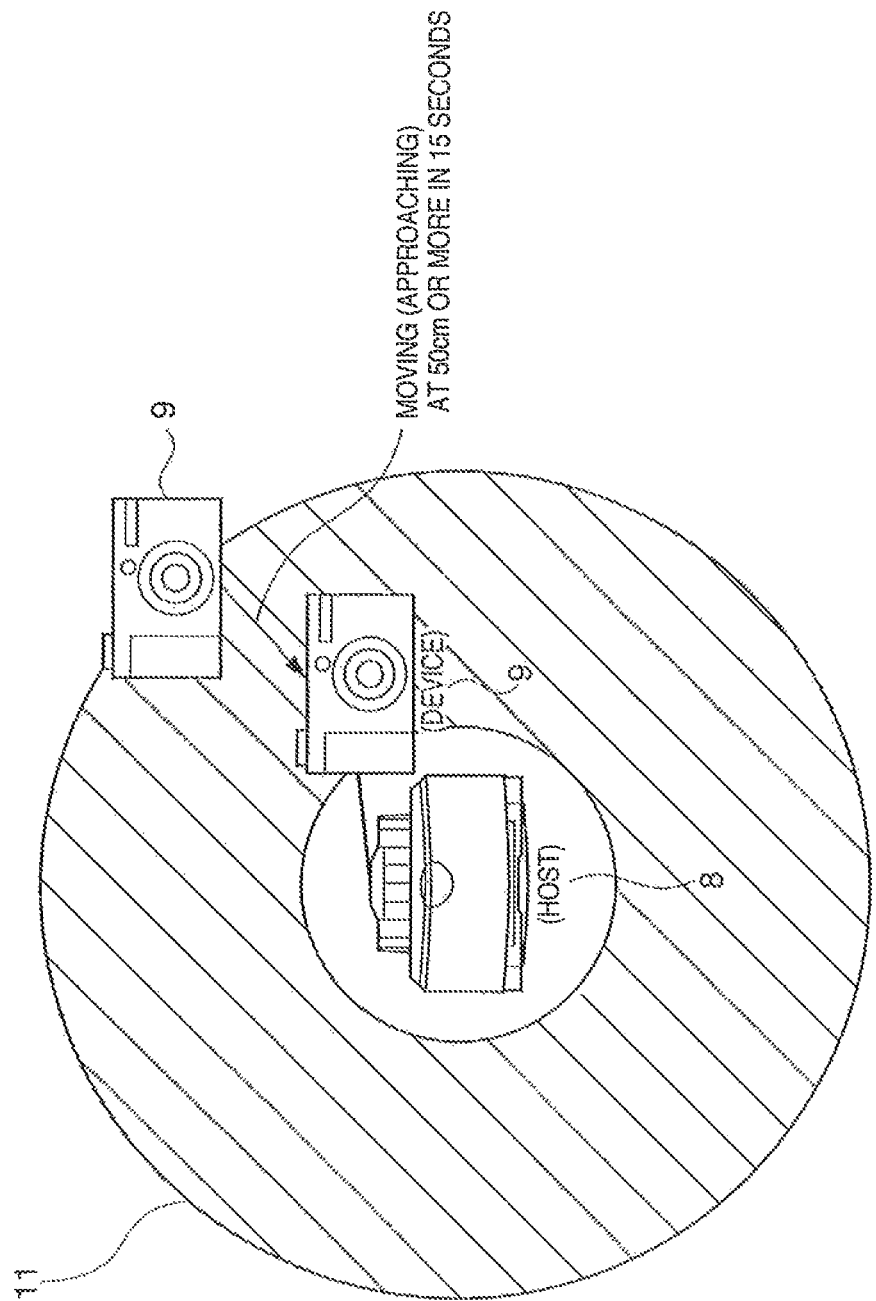
FIG. 3 is a diagram showing schematically a second example of connection/disconnection control in the first exemplary embodiment of the present invention.

In the Example 2, in a state in which the digital camera 9 has entered the UWB connectable area 11 as shown in FIG. 3, wireless communication is effected if within a predetermined time period (for example, 15 seconds) the digital camera 9 moves closer to the printer 8 by a predetermined distance (for example, 50 centimeters) or more. In other words, a UWB device whose change in distance (approach) is greater than a predetermined amount is identified as a connection.

In addition, conversely, in a state in which the digital camera 9 is within the UWB connectable area 11, the wireless connection is disconnected if within a predetermined time period (such as 15 seconds) the digital camera 9 moves away from the printer 8 by a predetermined distance (such as 70 centimeters) or more.

In the Example 2 as well, as with the Example 1, the user can by intuitive operation easily effect a connection to a desired device. Further, in the Example 2, if the change in distance is great, it is deemed to be the case that the user has deliberately changed the distance with the intention of effecting a connection or a disconnection, which, by comparison with the Example 1, enables the probability of erroneous connection and disconnection to be reduced.

Example 3

Figure 4:
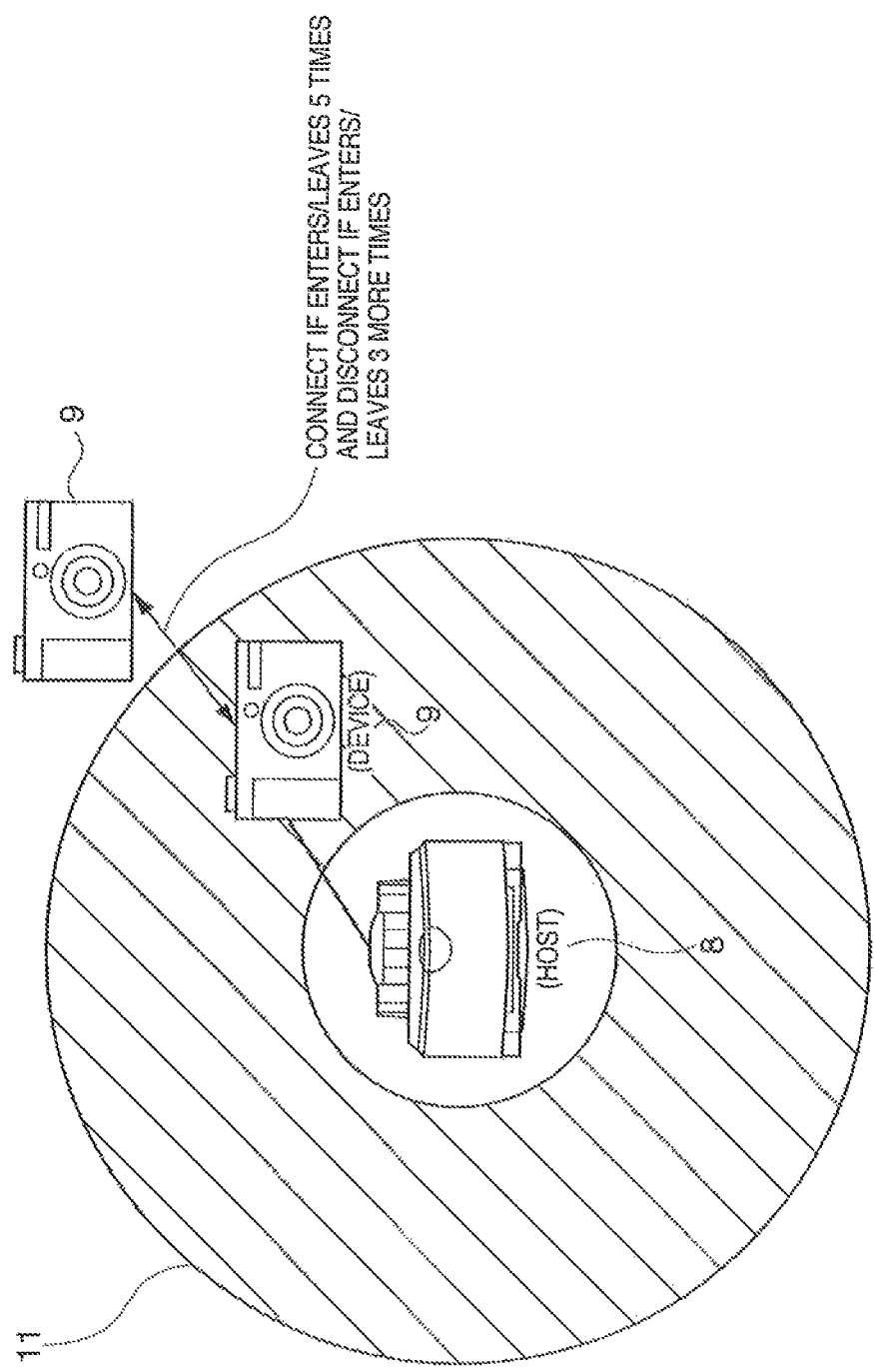
FIG. 4 is a diagram showing schematically a third example of connection/disconnection control in the first exemplary embodiment of the present invention.

In the Example 3, as shown in FIG. 4 wireless connection and disconnection are effected by the number of times the digital camera 9 enters and leaves the UWB connectable area 11 that the user sets in advance. Specifically, a UWB device for which a number of times whose determined distance has come from or beyond a predetermined distance to within a predetermined distance has reached a predetermined number of times is identified as a connection.

For example, a wireless connection is effected if the digital camera 9 enters and leaves the UWB connectable area 11 5 times. In addition, the printer 8 disconnects the wireless connection to the digital camera 9 if, for example, the digital camera 9 leaves the UWB connectable area 11 a further 3 times (for a total of 8 times). Then, the printer 8 searches to determine whether or not another wireless communication device is in the UWB connectable area 11.

In the Example 3 as well, as with the Example 1, the user can by intuitive operation easily effect a connection to a desired device. Further, in the Example 3, since connection and disconnection are determined based on the number of times the digital camera 9 enters and leaves the connectable area, the possibility that the user is moving the camera with the deliberate intention of connect in and disconnecting heightens, which, by comparison with the Example 1, enables the probability of erroneous connection and disconnection to be reduced.

It should be noted that connection and disconnection may be effected using as a precondition a predetermined number of times the device enters and leaves the area within a predetermined time period. In this case, setting the time period shorter further heightens the possibility that the predetermined number of times is due to deliberate user intention and further reduces the possibility of erroneous connection and disconnection.

Example 4

Figure 5:
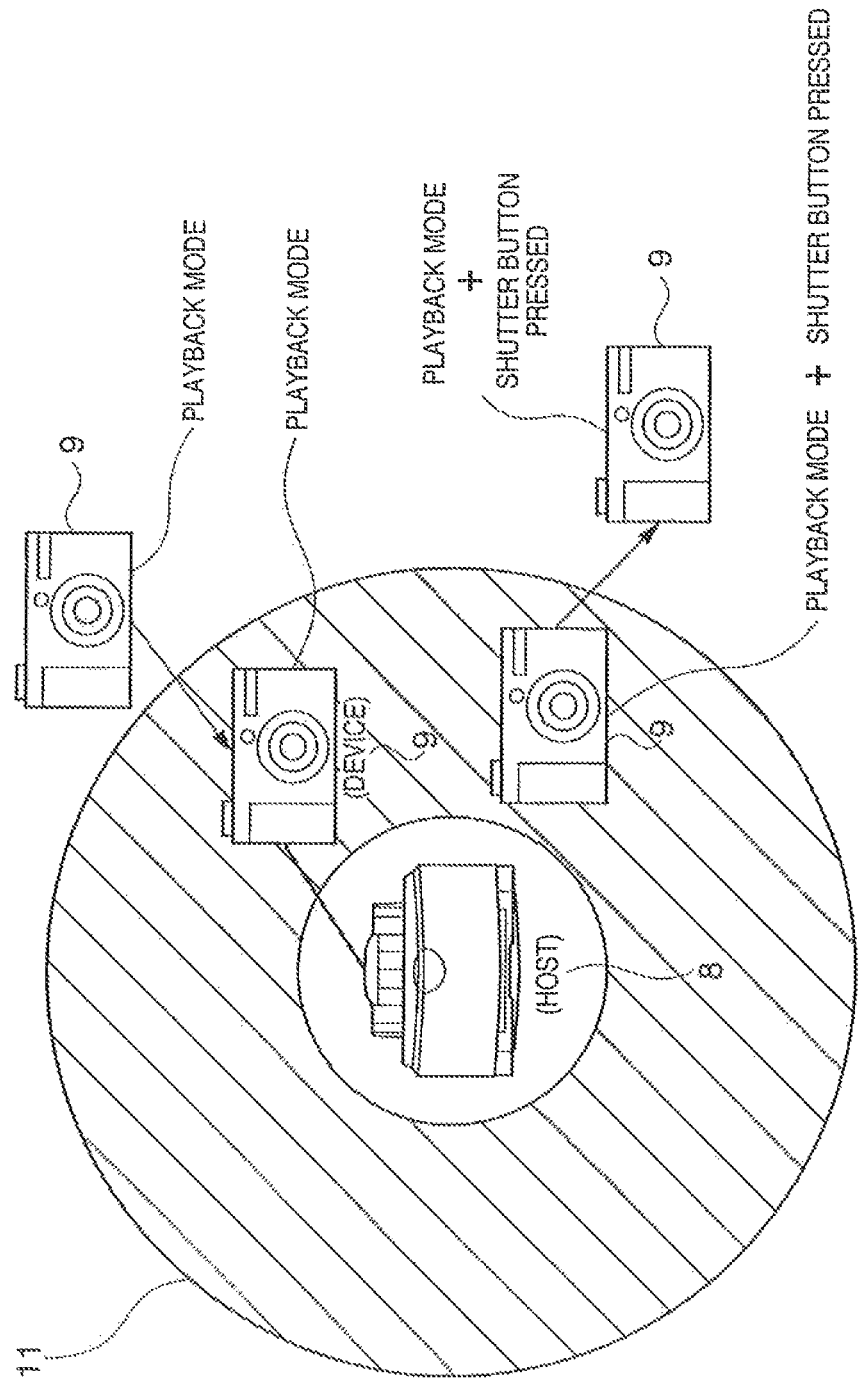
FIG. 5 is a diagram showing schematically a fourth example of connection/disconnection control in the first exemplary embodiment of the present invention.

In the Example 4, to the conditions of the Example 1 are further added sampling of the status of the digital camera 9 and effecting connection and disconnection. Specifically, as shown in FIG. 5, a connection is effected when the digital camera 9 enters the connectable area in a predetermined, particular operating mode or operating status.

In this case, first, the printer 8, which updates the distance information to the digital camera 9, initially establishes a wireless connection when the digital camera 9 enters the UWB connectable area 11. Then, the printer 8 may acquire the operating mode and a state of any buttons pressed of the digital camera 9 and maintain the wireless connection as is if these satisfy certain conditions. Alternatively, when the digital camera 9 enters the UWB connectable area 11, the printer 8 may query the digital camera 9 on its operating status and the state of any buttons pressed and establish a connection only if these satisfy certain conditions. In addition, the printer 8 may transmit to the digital camera 9 entering the UWB connectable area 11 a command requesting a response only when certain conditions are satisfied, and establish a connection only when there is a response within a usual time period.

In the Example 4, an established wireless connection is disconnected if the digital camera 9 is in an operating mode or an operating status that is different from a predetermined status in which a decision to establish a wireless connection is made. The printer 8 continues to measure the distance to the digital camera 9 even after the wireless connection is established. Then, when it is detected that the digital camera 9 has left the UWB connectable area 11, the printer 8 acquires the digital camera 9 operating mode and operating status. If, for example, as shown in FIG. 5, the operating mode is the playback mode, and further, the operating status is such that the shutter button is in a pressed state, the connected wireless communication is disconnected.

It should be noted that the status of the digital camera 9 may continue to be acquired from the moment the digital camera 9 enters the connectable area, with the determination of the need for disconnection made based on the status acquired just before the digital camera 9 leaves the UWB connectable area 11.

In addition, if it is possible to acquire the operating status of the digital camera 9 using the communication channel used for ranging, there is no need to establish a wireless connection in order to acquire the status of the digital camera 9.

Figure 7A:
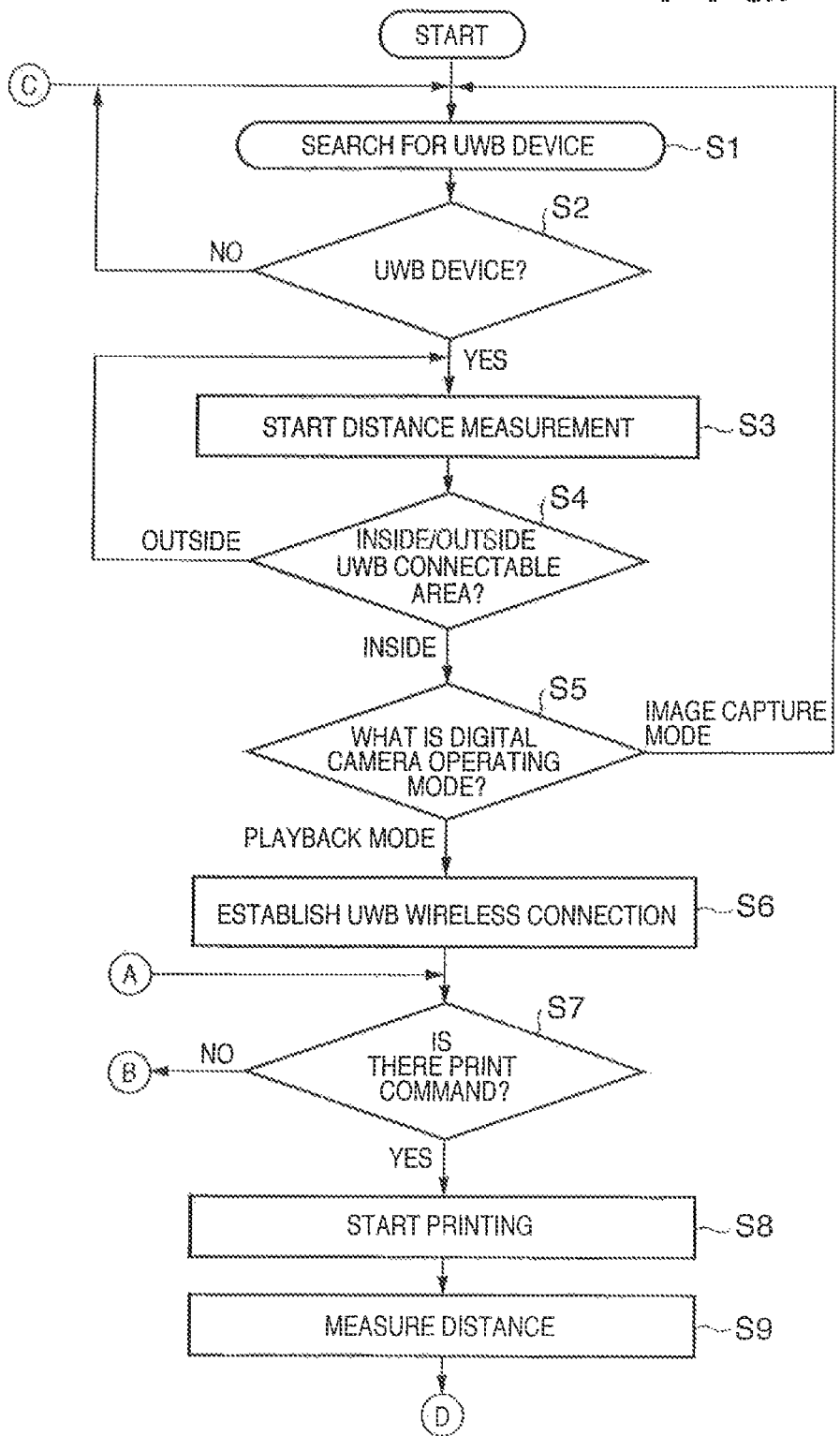
FIGS. 7A and 7B are flow charts illustrating processing steps of a printer 8 that is an example of the wireless communication device of the first exemplary embodiment of the present invention.
Figure 7B:
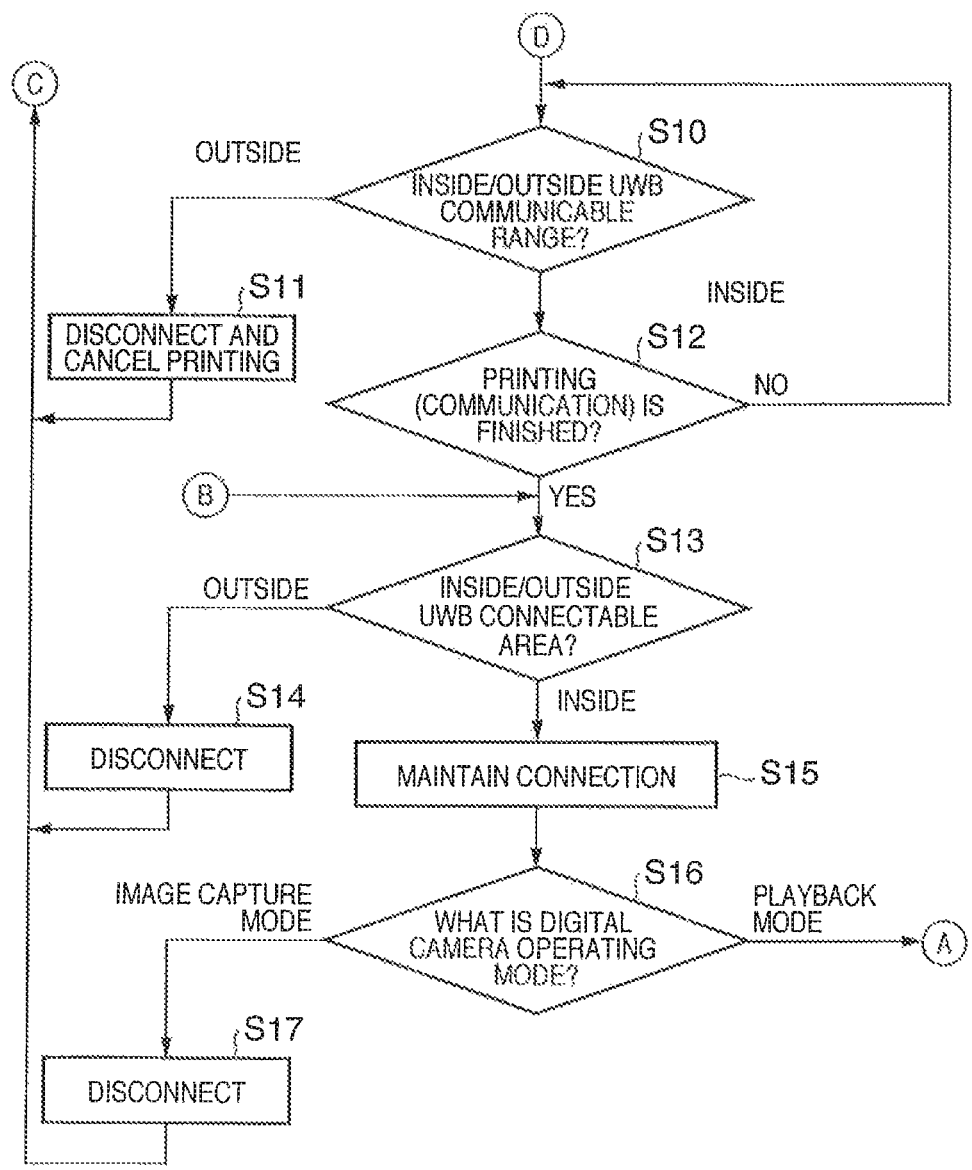

FIGS. 7A and 7B are flow charts illustrating processing steps of the printer 8 of the first exemplary embodiment. The processing shown in the flow charts shown in FIGS. 7A and 7B is implemented by the printer control unit 80 executing a control program and controlling each part of the printer 8.

Here, an example is given of establishing and disconnecting a wireless connection under the following conditions:

Establishing a wireless connection once a digital camera in the playback mode enters the UWB connectable area 11.

Disconnecting the wireless connection once a connected digital camera leaves the UWB communicable range 12 during printing.

Disconnecting the wireless connection once a connected digital camera leaves the UWB communicable range 12 before printing or after finishing printing.

Disconnecting the wireless connection once a connected digital camera switches to image capture mode before printing or after finishing printing.

In the loop of steps S1 to S2, the wireless communication unit 100 periodically searches to determine whether or not there is a UWB device within UWB wireless communication range (UWB communicable range 12).

In step S2, if there is no UWB device in the UWB communicable range 12, processing returns to step S1 and the wireless communication unit 100 repeats its periodic searches. By contrast, if there is a UWB device in the UWB communicable range 12, the wireless communication unit 100 starts to measure the distance to that UWB device using the UWB ranging function (step S3). Here, the digital camera 9 is present as the UWB device.

Using the distance information obtained as a result of that ranging, the wireless control unit 7 of the wireless communication unit 100 determines whether or not the distance to the digital camera 9 is within the UWB connectable area 11 (step S4). If the ranging results indicate that the distance is not within the UWB connectable area 11, processing returns to step S3 and the ranging process is repeated.

If the ranging results are such as to be within the UWB connectable area 11, the wireless control unit 7 determines if the digital camera 9 operating mode is the image capture mode or the playback mode (step S5). If the operating mode is the image capture mode, UWB wireless connection (data communication) is not carried out and processing returns to step S1.

It should be noted that, for UWB devices within UWB communicable range 12, a list that includes such unique information as IDs is generated and maintained in a storage device, not shown, inside the printer control unit 80. The printer control unit 80, using the wireless communication unit 100, then executes the ranging process of step S3 to step S5 for each and every UWB device on that list, in order, until one that satisfies connection conditions is detected.

By contrast, if the digital camera 9 operating mode is the playback mode, the wireless control unit 7 identifies the digital camera 9 as a device with which a wireless connection should be established. Then, the wireless control unit 7 establishes a UWB wireless connection between the printer 8 and the digital camera 9, and starts communication by UWB (step S6). At this point, at the digital camera 9 with which communication by UWB has become possible, the camera control unit 90 receives a notice from the wireless control unit 7 and, after displaying for example the message shown in 6B of FIG. 6, displays a print command menu, not shown, on the display unit 91. The menu screen and the data for message display are stored in advance in a storage device, not shown, of the digital camera 9.

The print command menu comprises, for example, a list display area displaying image data stored on a storage medium inserted in the recording unit 92 of the digital camera 9 and an area for specifying the print size and the number of copies for the image data of the print image selected in the list display. Then, the digital camera 9 user operates an operation unit 95 and selects at least one image to be printed from the print command menu list display area. The user then specifies the print parameters for the selected image data (size, number of copies and so forth) and orders print execution.

The printer 8 checks for a print execution command from the digital camera 9 (step S7). If there is no command, processing shifts to step S14.

If a print execution command has been received, the digital camera 9 and the printer 8 start direct printing in accordance with the Pictbridge standard or the like (step S8). At this time, it is not necessary for the digital camera 9 and the printer 8 print application to be aware of whether the connection is a wire connection or a wireless connection, since printing can proceed while the digital camera 9 and the printer 8 exchange commands and data just as with direct printing by conventional wire connection. It should be noted that the wireless control unit 7 controls the antenna switching unit 2 to make it possible to process print data communications (image data transmission and the like) and ranging communications within a predetermined time period. In other words, in the first exemplary embodiment, the wireless communication unit 100 uses time division to implement ranging communication and data communication.

The wireless communication unit 100 periodically measures the distance to a wirelessly connected UWB device (the digital camera 9) using the UWB ranging function (step S9). Then, during printing, the wireless communication unit 100 determines whether or not the digital camera 9 is within the UWB communicable range 12 (step S10). If the ranging results indicate that the digital camera 9 has moved beyond the UWB communicable range 12, the wireless control unit 7 disconnects the connection and the printer control unit 80, having received notice of the disconnection, cancels printing being executed at the printer engine unit 82 (step S11). If the ranging results indicate that the digital camera 9 is located within the UWB communicable range 12, a determination is then made as to whether or not printing is finished (more precisely, whether the communication needed for printing is finished) (step S12). If printing is continuing, processing returns to step S10. If printing is finished, processing proceeds to step S13.

If printing finishes without the digital camera 9 leaving the UWB communicable range 12, it is then determined from the ranging results if the digital camera 9 remains in the UWB connectable area 11 (step S13). Then, if the digital camera 9 has moved beyond the connectable area, the connection is disconnected (step S14) and the printer resumes the search for UWB devices (step S1). If the digital camera 9 is located within the UWB connectable area 11 after printing finishes, the wireless connection is maintained (step S15). Then, in step S16, the digital camera 9 operating mode is checked. If the operating mode remains the playback mode, processing returns to step S7 and it is again determined if there is a print execution command. By contrast, if the digital camera 9 operating mode has changed to the image capture mode, the wireless communication is disconnected (step S17) and processing returns to step S1.

Thus, as described above, according to the first exemplary embodiment, establishment and disconnection of wireless connection between wireless communication devices is carried out based on the distance between devices as determined by the ranging function of the wireless communication method and any change therein. As a result, simply moving the wireless communication device to a predetermined location in relation to a desired other device enables the user to establish as well as disconnect a wireless connection without specifying the desired device and inputting commands to connect or disconnect.

It should be noted that, in the first exemplary embodiment, a description is given of an arrangement that uses UWB as an example of a wireless communication method having a ranging function. However, the control of the establishment and disconnection of a wireless connection as described above can be applied to any wireless communication device using any wireless communication method that has a ranging function, including wireless communication methods to be implemented in the future.

Second Exemplary Embodiment

Next, a description will be given of a second exemplary embodiment that is a variation of the first exemplary embodiment. It should be noted a description is omitted of those parts of the second exemplary embodiment that are the same as the first exemplary embodiment.

Figure 10:
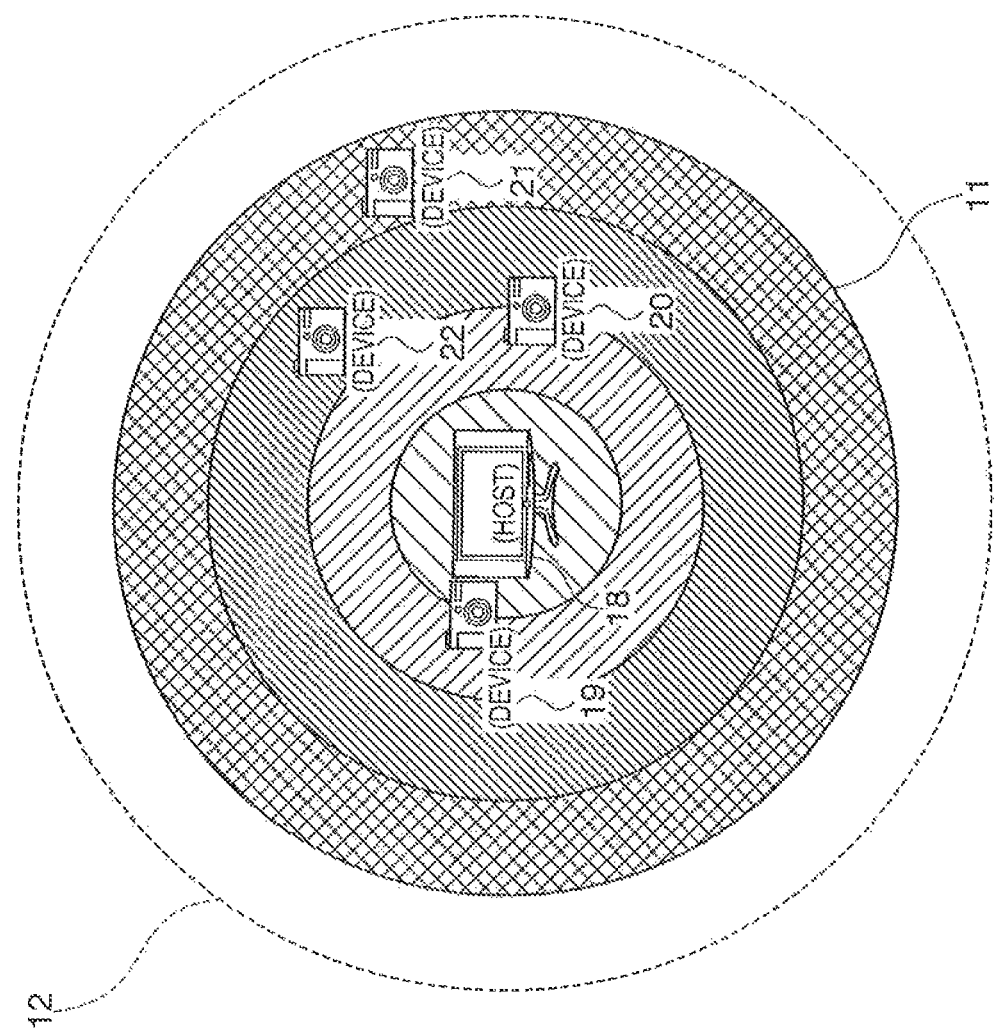
FIG. 10 is a diagram illustrating a second exemplary embodiment of the present invention.

FIG. 10 is a diagram illustrating a second exemplary embodiment of the present invention.

In the first exemplary embodiment, the UWB host (the printer 8) establishes a connection with one UWB device (the digital camera 9), and, after a connection is established, processes (prints) while communicating until the UWB device satisfies disconnection conditions.

By contrast, in the second exemplary embodiment, a single UWB host carries on with processing while communicating wirelessly sequentially with a plurality of UWB devices.

In the second exemplary embodiment, an environment is assumed in which a television receiver (hereinafter "television") 18 is the UWB host and four UWB devices are present within UWB connection authentication range (the UWB connectable area) 11. Here, the four UWB devices are, for example, digital cameras 19-22. Then, the television 18 determines the distances between the television 18 and the digital cameras 19-22 and decides an order of connection based on that distance information. Thereafter, in the second exemplary embodiment, the television 18 and the digital cameras 19-22 are wirelessly connected, in order, according to that order of connection, and images are transmitted continuously from the four digital cameras to the television 18 and a slide show performed on the television 18. It should be noted that the digital cameras 19-22 also are examples of the wireless communication device of the second exemplary embodiment, and have the same structure as the digital camera 9.

Figure 14:
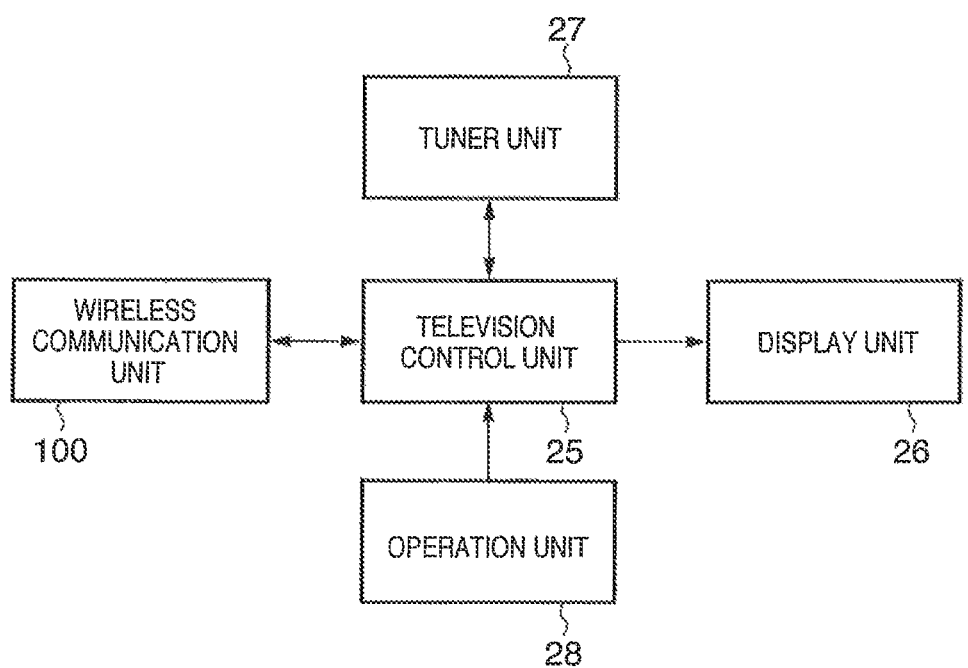
FIG. 14 is a block diagram showing the main structural components of the television 18 that is an example of the wireless communication device of the second exemplary embodiment of the present invention.

FIG. 14 is a block diagram showing the main structural components of the television 18 that is an example of the wireless communication device of the second exemplary embodiment.

A television control unit 25 controls the operation of the television 18. The television control unit 25 comprises a CPU, a storage device (a non-volatile memory, hard disk drive or the like) containing a control program executable by such CPU, and a RAM used as a work area by such CPU.

A display unit 26 is either a display device, such as an ordinary LCD, plasma display panel or SED (Surface-conduction Electron-emitter Display), or a CRT. The display unit 26 displays television signals that a tuner unit 27 receives, the operating status of the television 18, on-screen menu displays, menu screens, messages for the user, image data transmitted from the digital cameras 19-22 and so forth. The display is performed in accordance with control by the television control unit 25.

The tuner unit 27 is a so-called television tuner, and receives such broadcasts as terrestrial analog/digital broadcasts, satellite analog/digital broadcasts and the like, through for example an antenna, not shown. In the second exemplary embodiment, the tuner performs such processes as decoding the video and audio signals received, up to generating signals (or data) that can be displayed on the display unit 26 from the reception signals.

The operation unit 28 is used by the user to input commands to the television 18, for which buttons, keys, touch panels and the like are generally used. In the second exemplary embodiment, the operation unit 28 includes not only that which is provided on the television 18 but also includes that provided on a remote control.

The television control unit 25 can also control the operation of the wireless communication unit 100. However, processes relating to the establishment and the disconnection of wireless connections to other wireless communication devices are carried out chiefly by the wireless communication unit 100, with such events as wireless connection establishment and disconnection reported from the wireless control unit 7 to the television control unit 25. The television control unit 25 responds to these events, and, for example, prepares for data transmission, controls the slide show operation, and so forth.

In the second exemplary embodiment, the television 18 is the UWB host and the digital cameras 19-22 are the UWB devices. The television 18 and the digital cameras 19-22 are mutually recognised in advance as devices capable of performing UWB wireless communication. Moreover, ranging between the television and the digital cameras using the UWB ranging function is carried out by the television 18, which decides to establish or disconnect wireless connections to the digital cameras 19-22 using the distance information obtained by that ranging.

In addition, the setting of the distance over which wireless communication is possible between the UWB host and the UWB devices (that is, the UWB connectable area 11) may be accomplished, for example, by using the remote control to manipulate the UWB host television 18 menu screens and on-screen displays. The user can set the UWB connectable area 11 to any distance that is within the UWB communicable range 12 over which UWB wireless communication is possible.

In a case in which all four digital cameras 19-22 capable of communicating wirelessly with the television 18 are within the UWB communicable range 12 as shown in FIG. 10, the television 18 determines the distance to each of the digital cameras 19-22 using the UWB ranging function. The measurement by the television 18 of the distances between the television 18 and the four digital cameras 29-22 is carried out in stages by adjusting the output of the UWB distance measuring waves and by searching the devices within predetermined ranges.

Figure 11:
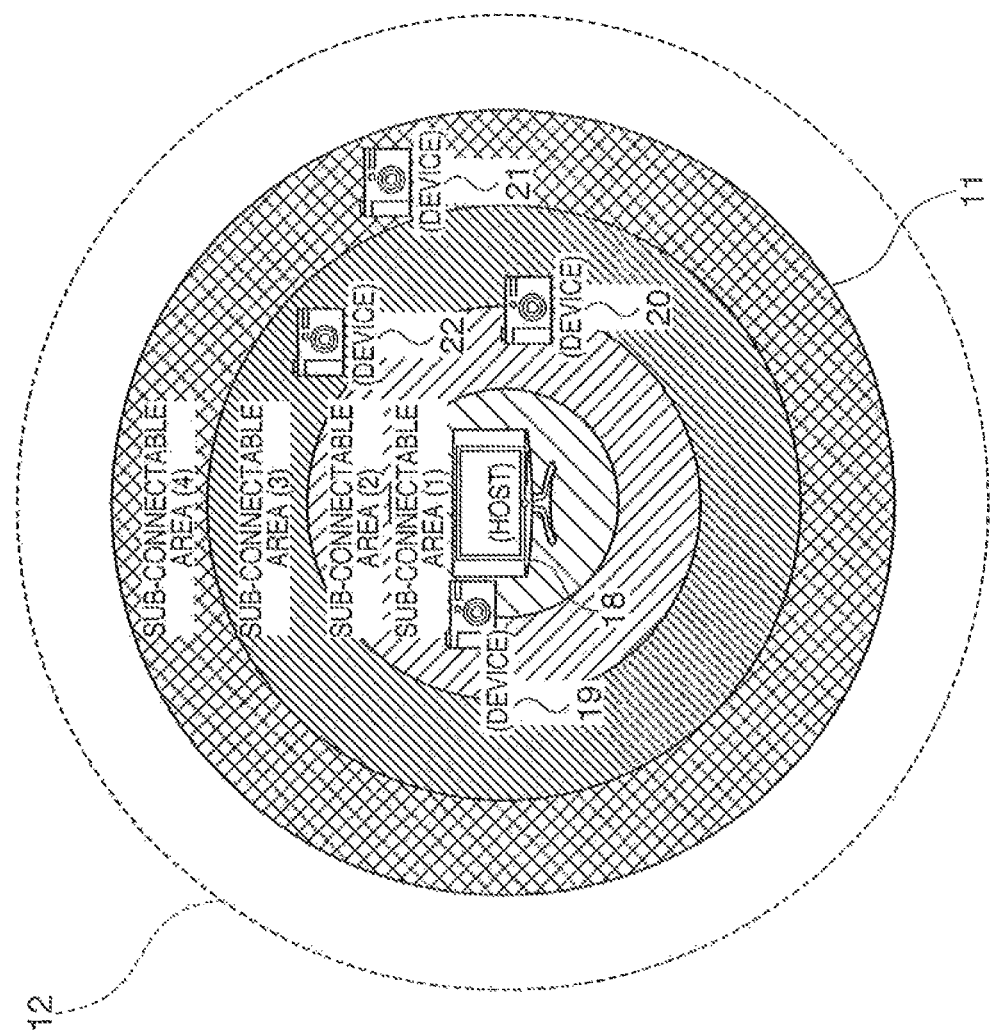
FIG. 11 is a diagram showing schematically an example of a predetermined range that a television 18 searches in stages when acquiring the distance to and information unique to a device in the environment shown in FIG. 10.

FIG. 11 is a diagram showing schematically an example of the predetermined ranges in which the television 18 searches in stages when acquiring the distance to and information unique to a device in the environment shown in FIG. 10.

As shown in FIG. 11, the UWB connectable area 11 is divided into a plurality of regions (sub-connectable areas (1)-(4)) depending on distance range from the UWB host, and a search is conducted in each sub-connectable area from near sub-connectable area to far sub-connectable area.

First, as an initial matter, the television 18 conducts a search to determine whether or not a device capable of performing UWB wireless communication is within the connectable area (1) range. Specifically, the television 18 transmits the UWB distance measuring waves at an output that is just enough to cover the sub-connectable area (1) range that is the closest to the television 18 (that is, low output). If a device (such as the digital camera 19) capable of performing UWB wireless communication is found in the sub-connectable area (1), the television 18 establishes a wireless connection (for data transmission purposes) to that device (such as the digital camera 19). Then, the television 18 conducts UWB wireless data transmission and acquires device information unique to that device.

After acquiring the distance information, the television 18 disconnects the wireless connection with the digital camera 19 and then conducts a further search to determine whether or not there is a device capable of performing UWB wireless communication within the sub-connectable area (2). If a device (for instance, the digital camera 20) capable of performing UWB wireless communication is found in the sub-connectable area (2), the television 18 establishes wireless connection with that device, performs wireless data transmission by UWB, and acquires the distance information that is unique to that device.

By increasing the output (the strength) of the UWB distance measuring waves little by little, the television 18 gradually sequentially expands the search range from the sub-connectable area (1) to the sub-connectable area (4). Then, the television 18 repeats the process of establishing wireless connections to communicable devices newly discovered by expansion of the search range, acquiring device information and disconnecting the wireless connection, until it has acquired device information and distance information for all the UWB devices within the UWB connectable area 11.

If the results of the UWB ranging conducted by the television 18 indicate that there are multiple digital cameras at the same or similar distance, the television 18 uses information other than the distance information to rank the devices. The speed of approach of these digital cameras, device information (such as when they were last operated) and the like can be used as such information other than distance information.

From the distance information obtained as a result of the ranging carried out as described above, and from the device information that is unique to each device capable of UWB communication, the television 18 creates a list that sets the order of connection by UWB (a connection priority list). Then, the television 18 establishes a UWB wireless connection and carries out data transmission in an order of priority that is set in advance by the user, for example, in order from the nearest device.

In the example shown in FIG. 11, the wireless communication unit 100 effects a UWB wireless connection to the digital camera 19 that is closest the television 18, and notifies the television control unit 25 that a wireless connection has been established. In response, the television control unit 25 sends a request to the digital camera 19 to transmit image data. Then, the image data received from the digital camera 19 is stored in a storage device, not shown, as necessary converted to a resolution suited to the display unit 26, and displayed as a slide show on the display unit 26. With respect to the slide show display, matters may be configured so that various display processes, such as fast forward and rewind, are executed in response to commands from the remote control.

While the television 18 is displaying a slide show of the image data from the digital camera 19, the remaining three digital cameras 20, 21, 22, whose order of connection on the connection priority list is second or lower, are in a standby state awaiting connection as long as they are within the UWB connectable area 11. Then, when UWB wireless communication between the television 18 and the digital camera 19 either is finished or communication is interrupted, wireless connections are established with the television 18 one after the other according to the order of the connection priority list.

The television control unit 25 updates the connection priority list any time communication ends or is interrupted, so as to reflect that communication has ended or communication has been interrupted and that there is a change in the connected device, or a change in distance while waiting in order for connection, thus enabling the newest order of connection always to be maintained on the connection priority list.

Thus, as described above, in the second exemplary embodiment, when there are multiple UWB devices within UWB connection authentication range, the UWB host determines the distance to each device, decides the order of connection using the results of that determination, and combines that with device information unique to each device to create a connection priority list. Then, effecting wireless connections with multiple devices in order based on the connection priority list enables the user to connect continuously to a plurality of wireless communication devices without having to issue specific instructions numerous times, thus improving user convenience. In addition, using the distance information enables the user to grasp the order of wireless connection with ease. As a result, when the user wishes to perform a slide show of images from multiple digital cameras, he or she can do so simply by adjusting the distance from the television 18 and arranging the digital cameras in the desired order, enabling the images to be displayed in the intended camera order.

Figure 12:
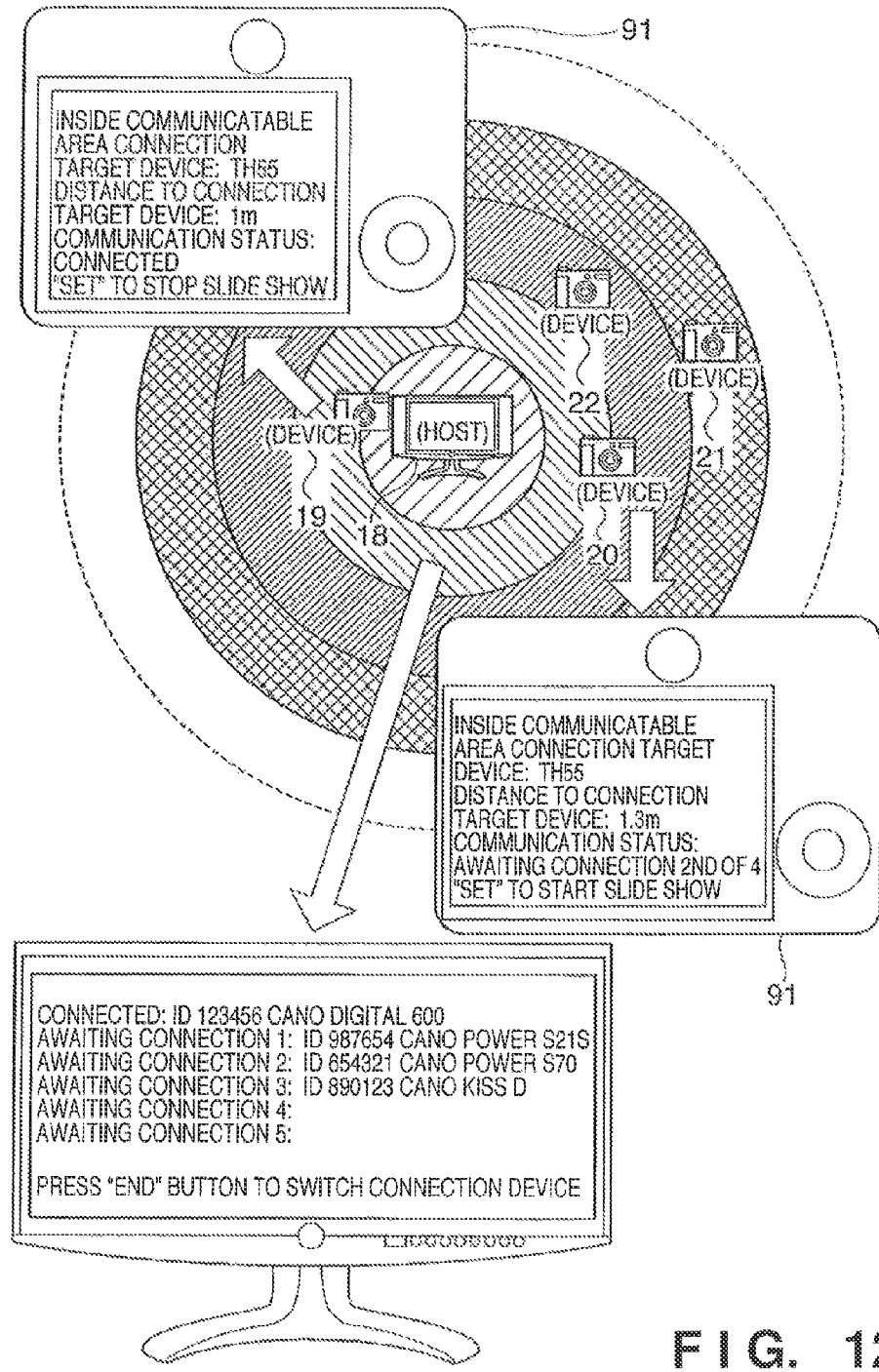
FIG. 12 is a diagram showing examples of information that can be displayed on a display unit 26 of the television 18 and on display units 91 of digital cameras 19-22 in the course of the connection control process illustrated in FIG. 11.

FIG. 12 is a diagram showing examples of information that can be displayed on a display unit 26 of the television 18 and on the display units 91 of digital cameras 19-22 in the course of the connection control process illustrated using FIG. 11.

As described in the first exemplary embodiment, in the second exemplary embodiment as well, the display unit of the wireless communication device can display messages and provide audio output regarding information relating to connected parties, information concerning connection status, distance information, device operating status and the like.

FIG. 12 shows a state in which the digital camera 19 that is closest to the television 18 is first in the order of connection priority and a UWB wireless connection with the television 18 has been established. At this time, the display unit 91 of the digital camera 19 displays the fact that it is within wireless communication range and that the connected party is the television 18 (TH55), as well as the current distance to the television 18, the connection status (connected) and information concerning possible operations.

In addition, the other three remaining digital cameras 20, 21 and 22 that are further from the television 18 than the digital camera 19 and whose connection priority order is second or lower within the UWB connectable area 11 stay in a standby state awaiting UWB connection. At this time, for example, the display unit 91 displays the fact that the digital camera 20 is within wireless communication range, the current distance to the television 18, the connection order, and the next operation to be carried out.

Displaying at the wireless communication device the information and the operations that the user needs for wireless communication as described above makes it possible to improve user convenience. Where the wireless communication device does not have a display unit, notice may be given by sound. The connection priority list created on the basis of the distances to the digital cameras 19-22 within the UWB connectable area 11 and the device information that is unique to each device are held and updated by the television 18 that becomes the UWB host.

In addition, as shown in FIG. 12, in certain instances, such as when the user operation or the connected device changes, the connection priority list can be displayed on the television 18. Unique device information, such as the name and the ID of the connected device, the order of devices awaiting connection, and the operation that the user should carry out next are included in the connection priority list as display contents. Making the connection priority list displayable in this manner and notifying the user thereby enables the user to know easily which operation the user should carry out next. Giving the user the ability to obtain device connection all at once in real time enables convenience during operation to be improved.

Figure 13:
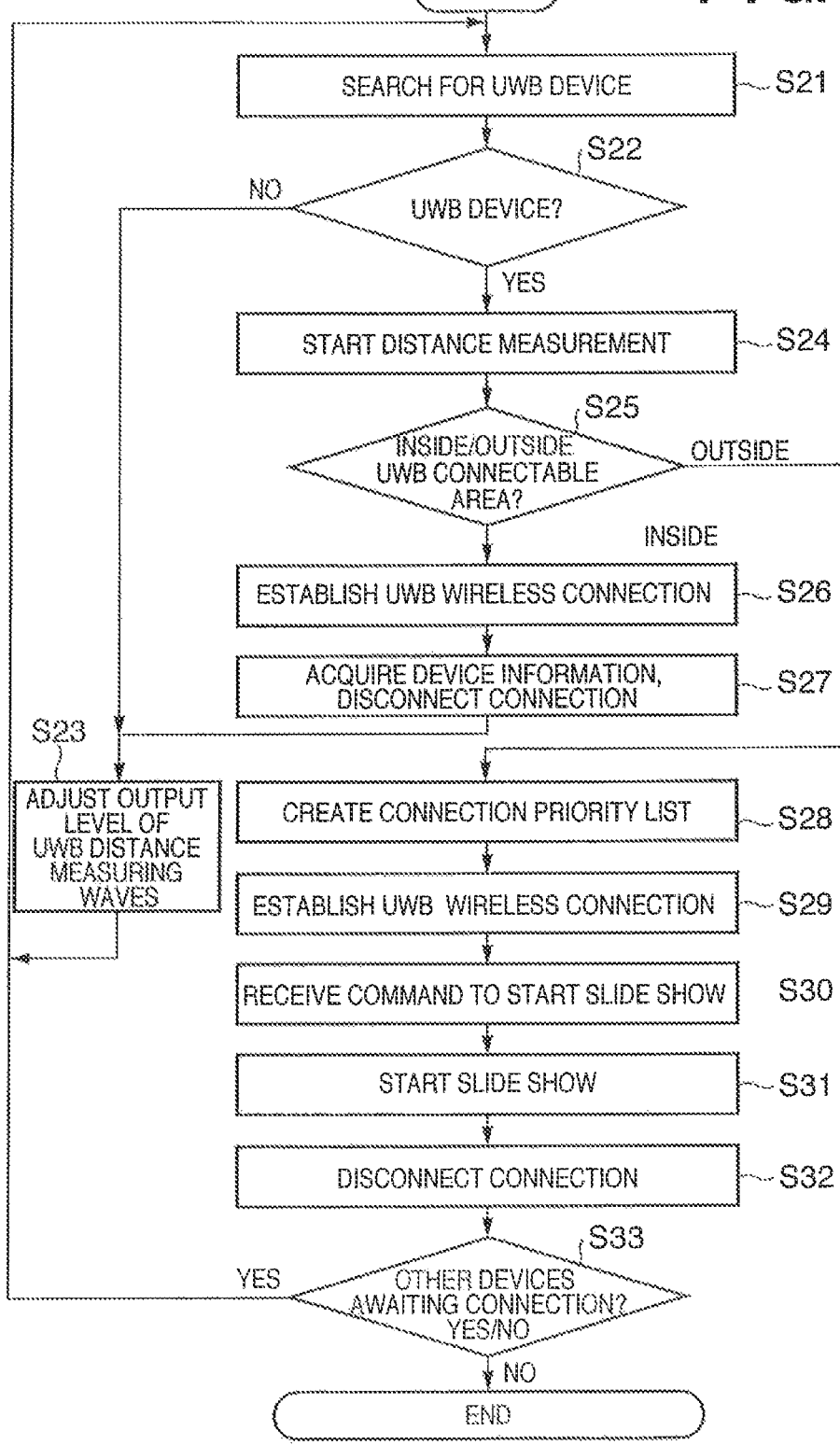
FIG. 13 is a flow chart illustrating processing steps of the television 18 in the second exemplary embodiment of the present invention.

FIG. 13 is a flow chart illustrating processing steps of the television 18 in the second exemplary embodiment. The processing shown in the flow chart shown in FIG. 13 is implemented by the television control unit 25 executing a control program and controlling each part of the television 18.

The loop of steps S21 to S27 is a process of searching in stages to determine whether or not one or more devices capable of performing UWB wireless communication is within the UWB connectable area 11.

The television 18 wireless communication unit 100 starts ranging using the UWB distance measuring waves of an output that reaches a minimum range (the sub-connectable area (1) in FIG. 11) (step S21). If there is no new UWB device is found (NO in step S22), an output level of the UWB distance measuring waves are boosted to a certain predetermined level (step S23) and another search is conducted in a farther sub-connectable area.

If in step S22 a new UWB device is found, the wireless communication unit 100 determines the distance to the UWB device using the UWB ranging function (step S24). Using the information obtained as a result of that ranging, the wireless communication unit 100 then determines whether or not the distance to the UWB device is within the UWB connectable area 11 within which UWB wireless communication is conducted (step S25).

If the UWB device is within the UWB connectable area 11, the wireless communication unit 100 establishes a UWB wireless connection and carries out data transmission (step S26), and acquires the device information that is unique to that device (step S27). Once the device information is acquired, the wireless connection is disconnected (step S27). The process of step S21-step S27 is repeated until all searches for UWB devices within the UWB connectable area 11 are finished.

In step S25, if the detected UWB device(s) is(are) outside the UWB connectable area 11, and the searches within the UWB connectable area 11 are completed, the wireless communication unit 100 creates a connection priority list using the distance information and the device information obtained by the searches conducted so far (step S28). At the least, the connection priority list sets the order of priority of multiple UWB devices within the UWB connectable area 11 on the basis of pre-set conditions (for example, in order of nearness) and the distance information. It should be noted that, as has been described already, when there is no difference in distance, or when there are multiple UWB devices within a predetermined range, the order of priority is decided using other information, such as information that is unique to each device.

Once the connection priority list is compiled, in step S29 the television control unit 25 establishes a UWB wireless connection with a UWB device (such as the digital camera) having the highest priority using the wireless communication unit 100.

In step S30, for example, a slide show start command input from the operation unit 28 is received. This causes the television control unit 25 to acquire image data from the digital camera to which the television 18 is connected and to start a slide show display of the images in order on the display unit 26 (step S31). Once acquisition of the image data that the connected digital camera has is finished, the television control unit 25 disconnects the wireless connection and ends data transmission (step S32). For those devices for which data transmission is completed, an indication to that effect is recorded on the connection priority list.

When communication with the connected device is finished, or when for some reason wireless communication is interrupted, the connection priority list is checked (step S33). If there are no more devices awaiting connection, processing ends.

By contrast, if there are devices awaiting connection, processing returns to step S21 and more ranging is carried out in order to update the connection priority list to reflect the latest positional status. Thereafter, communications with devices awaiting connection are established according to the order given in the updated connection priority list. At this time, since the devices for which data transmission has already been carried out are so recorded on the connection priority list, data transmission to such devices is not again carried out even if their positions change. The above-described process steps are repeated, continuously connecting multiple devices by UWB wireless communication, until there are no more devices awaiting connection.

Thus, as described above, when multiple wireless communication devices are present within communicable range, the second exemplary embodiment determines the order of connection based on at least the distance information and information unique to each device, and effects connections one by one in accordance with that order, thus enabling the user to effect wireless connection in a desired order by adjusting the positions of multiple wireless communication devices with respect to a common counterparty wireless communication device.

Other Exemplary Embodiments

The above-described exemplary embodiment can also be implemented as software by a computer (or a CPU, MPU or the like) of a system or an apparatus.

Accordingly, since a computer implements the functional processes of the present invention, a program supplied to and installed in the computer itself also accomplishes the present invention. In other words, the computer program for implementing the functional processes of the present invention is also an aspect of the present invention.

In that case, so long as the system or apparatus has the capabilities of the program, the program may be executed in any form, such as an object code, a program executed by an interpreter, or script data supplied to an OS.

In this case, the computer program for implementing the functional processes of the present invention by computer is supplied by storage media or by wire/wireless communications. Examples of storage media that can be used for supplying the program are magnetic storage media such as a floppy disk, a hard disk, or magnetic tape, optical/magneto-optical storage media such as an MO, a CD-ROM, a CD-R, a CD-RW, a DVD-ROM, a DVD-R, or a DVD-RW, and a nonvolatile semiconductor memory or the like.

As for the method of supplying the program using wire/wireless communications, there is, for example, a method in which a data file (program data file), either a computer program itself that forms the present invention or a file or the like that is compressed and automatically installed, and capable of becoming the computer program that comprises the present invention on a client computer, is stored on a server on a computer network. The program data file may be in an executable format, or it may be in the form of source code.

Then, the program data file is supplied by downloading to a connected client computer accessing the server. In this case, the program data file may also be divided into a plurality of segment files and the segment files distributed among different servers.

In other words, a server device that provides program data files for implementing the functional processes of the present invention by computer to one or more client computers is also covered by the claims of the present invention.

It is also possible to encrypt and store the program of the present invention on a storage medium, distribute the storage medium to users, allow users who meet certain requirements to download decryption key data from a website via the Internet, and allow these users to decrypt the encrypted program by using the key data, whereby the program is installed in the user computer.

Besides cases where the aforementioned functions according to the exemplary embodiments are implemented by executing the read program by computer, an operating system or the like running on the computer may perform all or a part of the actual processing, so that the functions of the foregoing exemplary embodiments can be implemented by this processing.

Furthermore, after the program read from the storage medium is written to a function expansion board inserted into the computer or to a memory provided in a function expansion unit connected to the computer, a CPU or the like mounted on the function expansion board or function expansion unit performs all or part of the actual processing so that the functions of the foregoing exemplary embodiment can be implemented by this processing.

While the present invention has been described with reference to exemplary embodiments, it is to be understood that the present invention is not limited to the disclosed exemplary embodiments. The scope of the following claims is to be accorded the broadest interpretation so as to encompass all modifications, equivalent structures and equivalent functions.

What is claimed is:

1. A wireless communication device comprising:
    a wireless communication unit that (a) establishes a wireless connection between the wireless communication device and an external device located in a first area, after the wireless communication device moves toward the external device and into a second area that is smaller than and within the first area, and (b) disconnects the wireless connection between the wireless communication device and the external device, after the wireless communication device moves away from the external device and out of the first area;
    a control unit that (a) controls the wireless communication device based on a first event indicating that the wireless connection between the wireless communication device and the external device has been established, and (b) controls the wireless communication device based on a second event indicating that the wireless connection between the wireless communication device and the external device has been disconnected; and a display unit that displays information about a distance by which the wireless communication device needs to be moved to establish the wireless connection between the wireless communication device and the external device, wherein the external device is capable of determining a range of the second area.

2. The wireless communication device according to claim 1, wherein the wireless communication unit is capable of measuring a distance to the external device.

3. The wireless communication device according to claim 1, wherein the wireless communication unit uses a short-range wireless communication method to communicate with the external device.

4. The wireless communication device according to claim 1, wherein the wireless communication unit uses one of UWB (Ultra-Wideband) and wireless USB (Universal Serial Bus) to communicate with the external device.

5. The wireless communication device according to claim 1, wherein the wireless communication device is capable of acting as a digital camera.

6. A method comprising:
    causing a wireless communication unit coupled to a wireless communication device to establish a wireless connection between the wireless communication device and an external device located in a first area, after the wireless communication device moves toward the external device and into a second area that is smaller than and within the first area;
    causing the wireless communication unit to disconnect the wireless connection between the wireless communication device and the external device, after the wireless communication device moves away from the external device and out of the first area;
    controlling the wireless communication device based on a first event indicating that the wireless connection between the wireless communication device and the external device has been established;
    controlling the wireless communication device based on a second event indicating that the wireless connection between the wireless communication device and the external device has been disconnected; and
    causing a display unit coupled to the wireless communication device to display information about a distance by which the wireless communication device needs to be moved to establish the wireless connection between the wireless communication device and the external device, wherein the external device is capable of determining a range of the second area.

7. The method according to claim 6, wherein the wireless communication unit is capable of measuring a distance to the external device.

8. The method according to claim 6, wherein the wireless communication unit uses a short-range wireless communication method to communicate with the external device.

9. The method according to claim 6, wherein the wireless communication unit uses one of UWB (Ultra-Wideband) and wireless USB (Universal Serial Bus) to communicate with the external device.

10. The method according to claim 6, wherein the wireless communication device is capable of acting as a digital camera.

11. A non-transitory computer-readable storage medium that stores instructions for causing a processor to execute a method, the method comprising:
    causing a wireless communication unit coupled to a wireless communication device to establish a wireless connection between the wireless communication device and an external device located in a first area, after the wireless communication device moves toward the external device and into a second area that is smaller than and within the first area;
    causing the wireless communication unit to disconnect the wireless connection between the wireless communication device and the external device, after the wireless communication device moves away from the external device and out of the first area;
    controlling the wireless communication device based on a first event indicating that the wireless connection between the wireless communication device and the external device has been established;
    controlling the wireless communication device based on a second event indicating that the wireless connection between the wireless communication device and the external device has been disconnected; and
    causing a display unit coupled to the wireless communication device to display information about a distance by which the wireless communication device needs to be moved to establish the wireless connection between the wireless communication device and the external device, wherein the external device is capable of determining a range of the second area.

12. The wireless communication device according to claim 1, wherein the display unit is capable of displaying information indicating whether the wireless communication device is within the first area.

13. The wireless communication device according to claim 1, wherein the display unit is capable of displaying information about a distance by which the wireless communication device needs to be moved to disconnect the wireless connection between the wireless communication device and the external device.

14. The method according to claim 6, further comprising causing the display unit to display information indicating whether the wireless communication device is within the first area.

15. The method according to claim 6, further comprising causing the display unit to display information about a distance by which the wireless communication device needs to be moved to disconnect the wireless connection between the wireless communication device and the external device.

16. A wireless communication device comprising:
    a wireless communication unit that (a) establishes a wireless connection between the wireless communication device and an external device located in a first area, after the wireless communication device moves toward the external device and into a second area that is smaller than and within the first area, and (b) disconnects the wireless connection between the wireless communication device and the external device, after the wireless communication device moves away from the external device and out of the first area;
    a control unit that (a) controls the wireless communication device based on a first event indicating that the wireless connection between the wireless communication device and the external device has been established, and (b) controls the wireless communication device based on a second event indicating that the wireless connection between the wireless communication device and the external device has been disconnected; and a display unit that displays information about a distance by which the wireless communication device needs to be moved to disconnect the wireless connection between the wireless communication device and the external device, wherein the external device is capable of determining a range of the second area.

17. The wireless communication device according to claim 16, wherein the wireless communication unit is capable of measuring a distance to the external device.

18. The wireless communication device according to claim 16, wherein the wireless communication unit uses a short-range wireless communication method to communicate with the external device.

19. The wireless communication device according to claim 16, wherein the wireless communication unit uses one of UWB (Ultra-Wideband) and wireless USB (Universal Serial Bus) to communicate with the external device.

20. The wireless communication device according to claim 16, wherein the wireless communication device is capable of acting as a digital camera.

21. The wireless communication device according to claim 16, wherein the display unit is capable of displaying information indicating whether the wireless communication device is within the first area.

22. A method comprising:

causing a wireless communication unit coupled to a wireless communication device to establish a wireless connection between the wireless communication device and an external device located in a first area, after the wireless communication device moves toward the external device and into a second area that is smaller than and within the first area;

causing the wireless communication unit to disconnect the wireless connection between the wireless communication device and the external device, after the wireless communication device moves away from the external device and out of the first area;

controlling the wireless communication device based on a first event indicating that the wireless connection between the wireless communication device and the external device has been established;

controlling the wireless communication device based on a second event indicating that the wireless connection between the wireless communication device and the external device has been disconnected; and causing a display unit coupled to the wireless communication device to display information about a distance by which the wireless communication device needs to be moved to disconnect the wireless connection between the wireless communication device and the external device, wherein the external device is capable of determining a range of the second area.

23. The method according to claim 22, wherein the wireless communication unit is capable of measuring a distance to the external device.

24. The method according to claim 22, wherein the wireless communication unit uses a short-range wireless communication method to communicate with the external device.

25. The method according to claim 22, wherein the wireless communication unit uses one of UWB (Ultra-Wideband) and wireless USB (Universal Serial Bus) to communicate with the external device.

26. The method according to claim 22, wherein the wireless communication device is capable of acting as a digital camera.

27. The method according to claim 22, further comprising causing the display unit to display information indicating whether the wireless communication device is within the first area.

28. A non-transitory computer-readable storage medium that stores instructions for causing a processor to execute a method, the method comprising:

causing a wireless communication unit coupled to a wireless communication device to establish a wireless connection between the wireless communication device and an external device located in a first area, after the wireless communication device moves toward the external device and into a second area that is smaller than and within the first area;

causing the wireless communication unit to disconnect the wireless connection between the wireless communication device and the external device, after the wireless communication device moves away from the external device and out of the first area;

controlling the wireless communication device based on a first event indicating that the wireless connection between the wireless communication device and the external device has been established;

controlling the wireless communication device based on a second event indicating that the wireless connection between the wireless communication device and the external device has been disconnected; and causing a display unit coupled to the wireless communication device to display information about a distance by which the wireless communication device needs to be moved to disconnect the wireless connection between the wireless communication device and the external device, wherein the external device is capable of determining a range of the second area.

* * * * *